United States Patent
Brinckman et al.

(10) Patent No.: US 11,038,881 B2
(45) Date of Patent: Jun. 15, 2021

(54) ANONYMOUSLY GENERATING AN ENCRYPTED SESSION FOR A CLIENT DEVICE IN A WIRELESS NETWORK

(71) Applicant: Cisco Technology, Inc., San Jose, CA (US)

(72) Inventors: Bart Brinckman, Nevele (BE); Jerome Henry, Pittsboro, NC (US); Malcolm Muir Smith, Richardson, TX (US); Mark Grayson, Berkshire (GB); David Delano Ward, Alleur (BE)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 16/178,239

(22) Filed: Nov. 1, 2018

(65) Prior Publication Data

US 2020/0145413 A1    May 7, 2020

(51) Int. Cl.
*H04L 29/06* (2006.01)
*H04L 9/32* (2006.01)
*H04W 12/06* (2021.01)
*H04W 84/12* (2009.01)

(52) U.S. Cl.
CPC .......... *H04L 63/0876* (2013.01); *H04L 9/32* (2013.01); *H04L 65/1069* (2013.01); *H04W 12/06* (2013.01); *H04W 84/12* (2013.01)

(58) Field of Classification Search
CPC ... H04L 63/0876; H04L 9/32; H04L 65/1069; H04L 9/3263; H04L 9/321; H04L 2209/80; H04L 63/0823; H04W 12/06; H04W 84/12

See application file for complete search history.

(56) References Cited

U.S. PATENT DOCUMENTS

| | | | |
|---|---|---|---|
| 7,269,727 B1 | 9/2007 | Mukherjee et al. | |
| 7,921,290 B2 | 4/2011 | Albert et al. | |
| 8,402,527 B2 | 3/2013 | Austin et al. | |
| 8,935,808 B2 | 1/2015 | Barbir | |
| 9,055,055 B1 * | 6/2015 | Strand | G06F 21/45 |
| 9,148,333 B2 | 9/2015 | Bustamente | |

(Continued)

OTHER PUBLICATIONS

Andrangi et al., "Chargable User Identity", Network Working Group, Jan. 2006, pp. 1-11.

(Continued)

*Primary Examiner* — Darren B Schwartz
(74) *Attorney, Agent, or Firm* — Patterson + Sheridan, LLP

(57) ABSTRACT

Various embodiments disclosed herein include apparatuses, systems, devices, and methods for anonymously generating an encrypted session for a client device in a wireless network. The method comprises, in response to providing, to the client device in the wireless network, a request for credentials associated with the client device, obtaining, from the client device, a response including proposed credentials associated with the client device. The method further comprises determining whether or not the format of the response matches a response template. The method further comprises, in response to determining that the format of the response matches the response template, generating an encrypted wireless session for the client device independent of the proposed credentials associated with the client device.

15 Claims, 6 Drawing Sheets

(56) References Cited

U.S. PATENT DOCUMENTS

| | | | | |
|---|---|---|---|---|
| 2005/0086079 | A1* | 4/2005 | Graves | H04L 29/06 |
| | | | | 705/2 |
| 2007/0118874 | A1* | 5/2007 | Adams | H04L 51/14 |
| | | | | 726/1 |
| 2007/0277231 | A1* | 11/2007 | Medvinsky | H04L 63/0815 |
| | | | | 726/5 |
| 2011/0179475 | A1* | 7/2011 | Foell | H04L 63/0815 |
| | | | | 726/6 |
| 2011/0214532 | A1 | 12/2011 | Austin et al. | |
| 2011/0302649 | A1* | 12/2011 | Foster | G06F 21/36 |
| | | | | 726/19 |
| 2012/0144471 | A1* | 6/2012 | Tsang | H04L 67/42 |
| | | | | 726/7 |
| 2013/0185767 | A1* | 7/2013 | Tirupachur Comerica | |
| | | | | H04L 9/321 |
| | | | | 726/4 |
| 2014/0223178 | A1 | 8/2014 | Islam et al. | |
| 2015/0082033 | A1* | 3/2015 | Bruce | H04L 63/0428 |
| | | | | 713/168 |
| 2016/0261565 | A1* | 9/2016 | Lorenz | H04L 9/0866 |
| 2019/0349191 | A1* | 11/2019 | Soriente | H04L 9/14 |

OTHER PUBLICATIONS

Barnes et al., "Automatic Certificate Management Environment (ACME)", IETF ACME Working Group, Internet-Draft, Oct. 2019, pp. 1-78.
Funk et al., "Extensible Authentication Protocol Tunneled Transport Layer Security Authenticated Protocol Version 0 (EAP-TTLSvo)", IETF Network Working Group, Internet-Draft, Aug. 2008, pp. 1-52.
M. Milinovic,"Eduroam Policy Service Definition", Geant, Version 2.8, GN3-12-192, Jul. 2012, pp. 1-29.

* cited by examiner

US 11,038,881 B2

ANONYMOUSLY GENERATING AN ENCRYPTED SESSION FOR A CLIENT DEVICE IN A WIRELESS NETWORK

TECHNICAL FIELD

The present disclosure relates generally to wireless networking, and in particular, anonymously generating an encrypted session for a client device in a wireless network.

BACKGROUND

A given access point provides network access to client devices within a coverage area provided by the access point. In certain deployments, the access point grants network access to a client device without the client device providing credentials. Without obtaining credentials from the client device, the client device cannot be authenticated. As a result, an authentication key cannot be generated and therefore an encrypted wireless session for the client device cannot be generated. The resulting unencrypted client device traffic is not secure.

In other deployments, the client device provides credentials in order to facilitate generation of an encrypted session. These credentials are validated in order to authenticate the client device and ultimately generate an encrypted session for the client device. However, the networking device(s) that authenticates the client device expends storage and processing resources while inspecting the credentials of the client device. Moreover, because the credentials include identifying information about the client device and sometimes the user of the client device, privacy and security associated with the client device are reduced.

BRIEF DESCRIPTIONS OF THE DRAWINGS

For a better understanding of aspects of the various embodiments described herein and to show more clearly how they may be carried into effect, reference is made, by way of example only, to the accompanying drawings.

Figure 1:
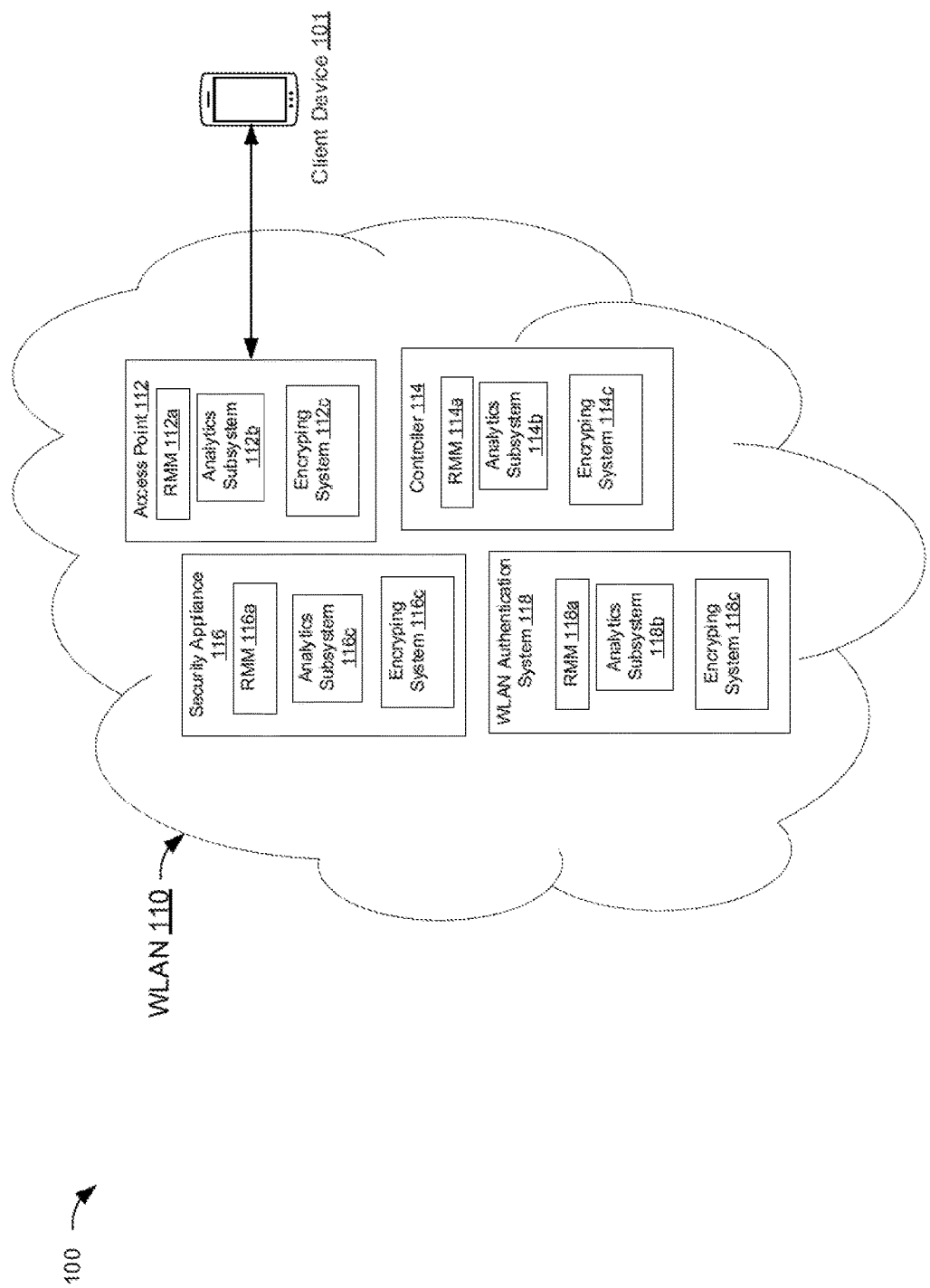
FIG. 1 is a block diagram of an example of a networking environment including one or more encrypting systems in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative embodiments shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the embodiments described herein.

Overview

Various embodiments disclosed herein include apparatuses, systems, devices, and methods for anonymously generating an encrypted session for a client device in a wireless network. The method comprises, in response to providing, to the client device in the wireless network, a request for credentials associated with the client device, obtaining, from the client device, a response including proposed credentials associated with the client device. The method further comprises determining whether or not the format of the response matches a response template. The method further comprises, in response to determining that the format of the response matches the response template, generating an encrypted wireless session for the client device independent of the proposed credentials associated with the client device.

In accordance with some embodiments, an encrypting system includes one or more communication interfaces, one or more processors, a non-transitory memory, and one or more programs. The one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions, which, when executed by one or more processors of an encrypting system, cause the encrypting system to perform or cause performance of any of the methods described herein. In accordance with some embodiments, an encrypting system includes: a communication interface, one or more processors, a non-transitory memory, and means for performing or causing performance of any of the methods described herein.

Example Embodiments

Public wireless networks (e.g., coffee shop Wi-Fi, guest profile in an enterprise network, etc.) have become ubiquitous. Generally, an access point in a wireless network grants network access to a client device (e.g., a laptop or smartphone) within a wireless coverage area provided by the access point. In some current deployments, credentials of the client device are inspected and validated before the client device is granted network access. In other current deployments, the access point grants network access to the client device without the client device providing credentials.

Current deployments including inspection of credentials and current deployments foregoing inspection of credentials have shortcomings. In one case, storage and processing resources are utilized while inspecting the credentials associated with the client device. In the other case, because the client device does not provide credentials, an encrypted session cannot be generated for the client device.

By contrast, in accordance with various embodiments disclosed herein, systems, methods, and devices generate an encrypted session for a client device independent of proposed credentials (e.g., dummy credentials) provided by the client device. Accordingly, storage and processing resources are reduced because an encrypting system need not inspect and validate the proposed credentials associated with the client device. Moreover, security and privacy are enhanced because the encrypting system generates an encrypted session for the client device, enabling the client device to transmit and receive encrypted (e.g., secured) traffic that is less susceptible to malicious attacks.

FIG. 1 is a block diagram of an example of a networking environment 100 including one or more encrypting systems in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the networking environment 100 includes a client device 101 and a wireless local area network (WLAN) 110 including a number of networking devices.

Although only one client device 101 is illustrated in FIG. 1, one of ordinary skill in the art will appreciate that any number of client devices 101 may exist in the networking environment 100. In some embodiments, the client device 101 corresponds to a user equipment (UE), such as one of a smartphone, laptop, tablet, IoT sensor, autonomous vehicle device, AR/VR device, etc. In some embodiments, the client device 101 includes multiple radios for communication with respective wireless networks each characterized by a radio access technologies (RAT). For example, in some embodiments, the client device 101 includes a radio for communicating with an IEEE 802-based wireless network (e.g., Wi-Fi) and another radio for communicating with a cellular network (e.g., 3GPP-defined 4G, LTE, 5G, etc.). Such a deployment is sometimes referred to as a heterogenous network.

The WLAN 110 includes an access point (AP) 112, a controller 114 (e.g., WLAN controller), a security appliance 116, and a WLAN authentication system 118. One of ordinary skill in the art will appreciate that the WLAN 110 may include fewer or additional of these and/or other network components in accordance with a desired operation of the WLAN 110. In some embodiments, the WLAN 110 is characterized by an IEEE 802-based RAT, such as a Wi-Fi network.

The AP 112 provides a wireless network coverage area that includes the client device 101. Although not illustrated, in some embodiments, the client device 101 is within respective coverage areas of multiple APs 112 at a given time. In some embodiments, the AP 112 includes a resource management module (RMM) 112a and/or an analytics subsystem 112b that are configured to provide management of data on each of a number of client devices 101 sharing one or more network resources. For example, in some embodiments, the RMM 112a and/or the analytics subsystem 112b are configured to monitor traffic to and/or from the client devices 101 and determine respective resource utilization values that are each representative of how much of a network resource is being utilized by a particular client device 101. In various embodiments, as illustrated in FIG. 1, additional networking devices in the WLAN 110, such as the controller 114, the security appliance 116, the WLAN authentication system 118, or a combination thereof, include respective RMMs and/or analytics subsystems. In various embodiments, the AP 112 includes an encrypting system 112c. The encrypting system 112c generates an encrypted session for a client device 101 independent of proposed credentials (e.g., dummy credentials) provided by the client device 101.

In various embodiments, the AP 112 includes or corresponds to a wireless base station that provides the client device 101 connectivity to the WLAN 110. In various implementations, the wireless base station provides wireless network access to one or more client devices within a corresponding coverage area. In other words, the wireless base station may corresponds to one of a variety of wireless access points for client devices, such as cellular base stations or unlicensed-band access points (e.g., Wi-Fi access points). Particular functionality of the wireless base station may be implemented in accordance to specific standards, and the wireless base station may in turn be referred to by other names particular to specific standards. For example, in some LTE-based implementations, the wireless base station corresponds to an eNodeB (providing coverage to a client device within a cellular network), or a home eNodeB (HeNodeB) providing a femtocell coverage area within a building. As another example, in some 5G-based implementations, the wireless base station corresponds to a gNodeB, having similar functionality to an eNodeB.

In various embodiments, the networking environment 100 includes a distributed encrypting system mechanism. For example, in some embodiments, portions of the encrypting system are integrated within two or more of: the AP 112 (the encrypting system 112c), the controller 114 (an encrypting system 114c), the security appliance 116 (an encrypting system 116c), or the WLAN authentication system 118 (an encrypting system 118c). According to various embodiments, the distributed portions of the encrypting system operate cooperatively (e.g., in concert).

In some embodiments, the WLAN 110 further includes the controller 114 that manages the AP 112 and additional APs (not illustrated). In some embodiments, the controller 114 corresponds to a wireless LAN controller (WLC). In some embodiments, the controller 114 corresponds to an intent-based networking system, such as Cisco's digital network architecture (DNA). In various embodiments, the controller 114 includes one or more of a RRM 114a, an analytics subsystem 114b, or an encrypting system 114c.

In some embodiments, the WLAN 110 further includes the security appliance 116 (e.g., a server) that protects the WLAN 110 from unwanted and/or harmful traffic. For example, the security appliance 116 includes a firewall, an antivirus scanning device, a content filtering device, an intrusion detection system, a prevention scanning device (e.g., penetration tester, vulnerability assessment system), or a combination thereof. In various embodiments, the security appliance 116 includes one or more of an RRM 116a, an analytics subsystem 116b, or an encrypting system 116c.

In some embodiments, the WLAN 110 further includes a WLAN authentication system 118. In some embodiments, the WLAN authentication system 118 corresponds to a layer two (L2) authentication server (e.g., AAA/RADIUS server), such as one commonly found in an enterprise deployment. In various embodiments, the WLAN authentication system 118 includes one or more of an RRM 118a, an analytics subsystem 118b, or an encrypting system 118c.

The networking environment 100 includes networking components that exist in many current networking deployments. For example, a particular current deployment includes an authentication system, such as a AAA/Radius server, that grants the client device 101 access to the WLAN 110. As illustrated in FIG. 1, the encrypting system is integrated within the WLAN authentication system 118, which corresponds to a AAA/Radius server in various embodiments. Accordingly, an enterprise operator need not modify existing infrastructure of a wireless network in order to realize the benefits of the embodiments disclosed herein. For example, the enterprise operator need not purchase additional networking equipment.

Figure 2:
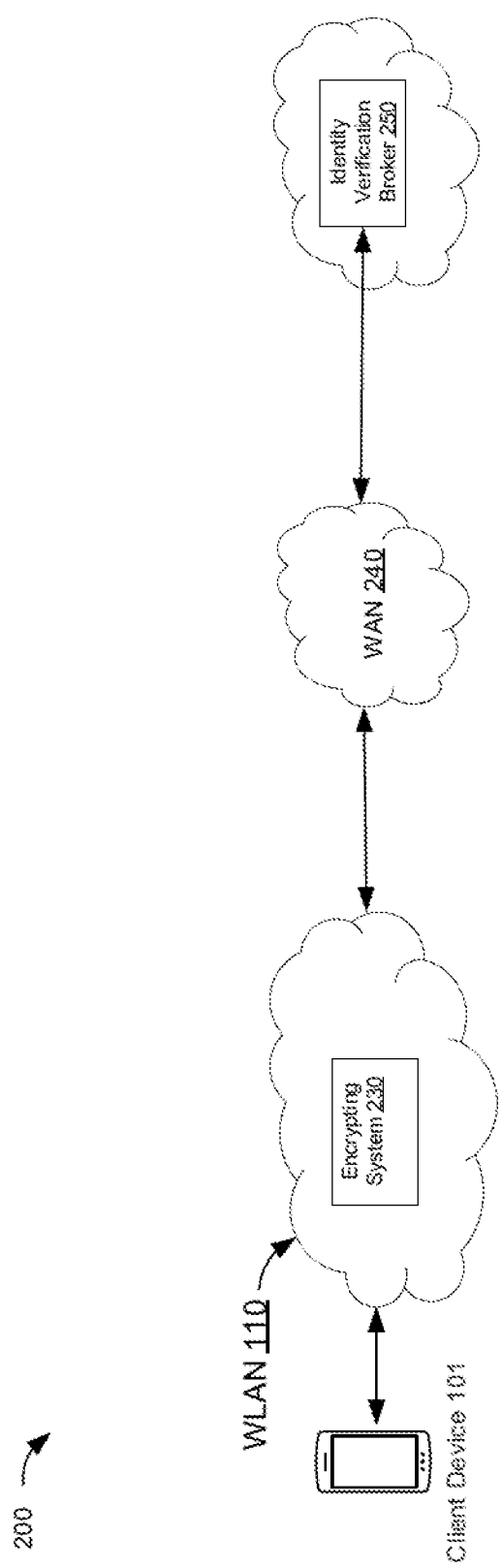
FIG. 2 is a block diagram of an example of a networking environment including an encrypting system and an identity verification broker in accordance with some embodiments.

FIG. 2 is a block diagram of an example of a networking environment 200 including an encrypting system and an identity verification broker in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the networking environment 200 includes a client device 101, an encrypting system 230, a wide area network (WAN) 240 (e.g., the Internet), and an identity verification broker 250. In various embodiments, the encrypting system 230 is similar to and adapted from one of the encrypting systems 112c, 114c, 116c, and 118c in FIG. 1. In various embodiments, the encrypting system 230 corresponds to a distributed encrypting system and may be similar to and adapted from a combination of the encrypting systems 112c, 114c, 116c, and 118c in FIG. 1.

According to various embodiments, the encrypting system 230 obtains a network group identifier (e.g., an access certificate) from the identity verification broker 250 over the WAN 240. In some embodiments, the encrypting system 230 and the identity verification broker 250 perform mutual authentication in order to generate a tunnel (e.g., transport layer security (TLS) tunnel). In some embodiments, the network group identifier is sent through the tunnel.

In various embodiments, the encrypting system 230 obtains the network group identifier in response to providing a request, to the identity verification broker 250, to join a group (e.g., federation) of trusted network entities. In response to determining that the encrypting system 230 is a valid network entity (e.g., not a rogue entity), the identity verification broker 250 provides the network group identifier to the encrypting system 230. In this way, the identity verification broker 250 on-boards the encrypting system 230. In various embodiments, the identity verification broker 250 is configured to implement terms and conditions, acceptable use policies, liability disclaimers, and provisions for providing a certain number of permanent identities of the client devices 101 of the WLAN 110. In some embodiments, the identity verification broker 250 is integrated within a cloud-based system, such as a software as a service (SaaS) system.

As an example, a network operator of a new store at a mall has installed an encrypting system 230 as part of a Wi-Fi network offered to the store's customers. Accordingly, the network operator configures the encrypting system 230 to request, from the identity verification broker 250, to join a group of other encrypting systems associated with other respective Wi-Fi networks associated with other stores at the mall. In response to determining that the request indicates that the encrypting system 230 is associated with a Wi-Fi network in a store in the mall and is thus valid, the encrypting system 230 provides a network group identifier to the encrypting system 230.

According to various embodiments, the encrypting system 230 generates an encrypted wireless session for the client device 101 in response to determining that the client device 101 is preconfigured to cooperate with the identity verification broker 250. In various embodiments, the client device 101 is configured out-of-the-box to cooperate with a list of trusted network entities each identified by a corresponding network group identifier provided by the identity verification broker 250. For example, in some embodiments, the client device 101 is preconfigured to cooperate with any encrypting system that obtained a network group identifier indicative of a group of wireless networks each associated with a particular coffee-shop chain. In some embodiments, the client device 101 is preconfigured to cooperate with the identity verification broker 250 without user intervention.

According to various embodiments, the encrypting system 230 provides, to the client device 101, an authenticity indicator associated with the encrypting system, wherein the authenticity indicator is based on the network group identifier obtained from the identity verification broker 250. The authenticity indicator indicates to the client device 101 that the encrypting system 230 is trustworthy. Additional details regarding the operation of the encrypting system 230 and the client device 101 vis-a-vis the authenticity indicator is provided, below.

Figure 3:
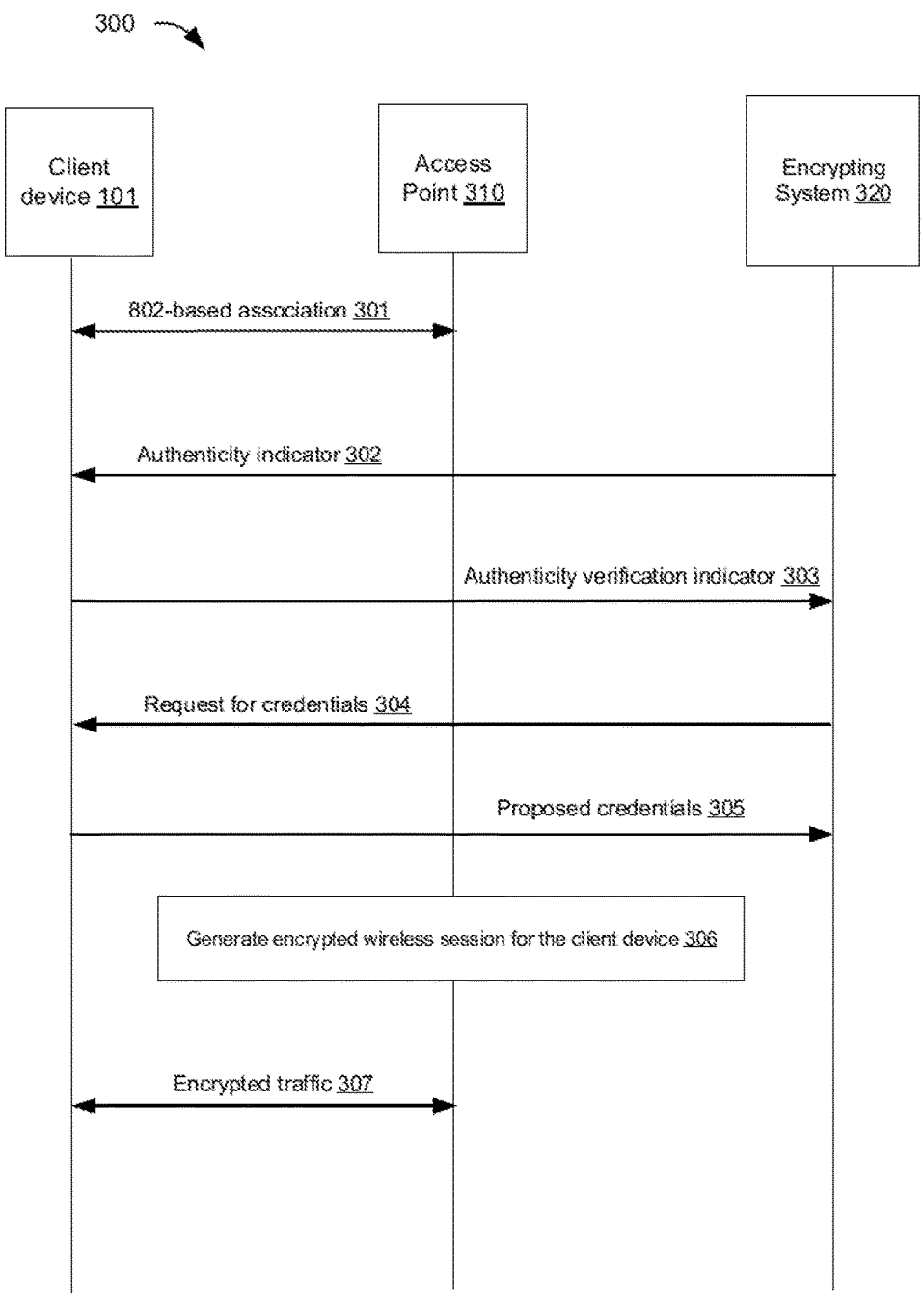
FIG. 3 is an example of a call flow with respect to anonymously generating an encrypted session for a client device in accordance with some embodiments.

FIG. 3 is an example of a call flow 300 with respect to anonymously generating an encrypted session for a client device in accordance with some embodiments. In various embodiments, the encrypting system 320 corresponds to one or more of the encrypting systems 112c, 114c, 116c, or 118c in FIG. 1. In various embodiments, the encrypting system 320 corresponds to the encrypting system 230 in FIG. 2. In various embodiments, the encrypting system 320 is included within an authentication system, such as a AAA/Radius server.

As represented by portion 301 of the call flow 300, the client device 101 and the access point 310 engage in an IEEE 802-based association process. Generally, this association process includes the client device 101 and the access point 310 exchanging a number of 802-based management frames, such as a probe request, a probe response, and/or the like.

After the client device 101 associates with the access point 310, in some embodiments, the encrypting system 320 provides an authenticity indicator (e.g., certificate, token, etc.) to the client device 101, as represented by portion 302 of the call flow 300. The authenticity indicator provides an indication to the client device 101 that the encrypting system 320 is trustworthy. In other words, the authenticity indicator indicates that the encrypting system 320 is not a rogue system. In some embodiments, the nature of the authenticity indicator is based on a network group identifier obtained from an identity verification broker, such as the identity verification broker 250 in FIG. 2.

In response to the client device 101 verifying the validity of the authenticity indicator, in some embodiments, the encrypting system 320 obtains, from the client device 101, an authenticity verification indicator, as represented by portion 303 of the call flow 300. The authenticity verification indicator effectively communicates to the encrypting system 320 that the client device 101 accepts that the encrypting system 320 is trustworthy. In some embodiments, the authenticity verification indicator corresponds to a transport layer security (TLS) certificate.

In response to obtaining the authenticity verification indicator, in some embodiments, the encrypting system 320 provides, to the client device 101, a request for credentials associated with the client device 101, as represented by portion 304 of the call flow 300.

In response to providing the request for credentials, the encrypting system 320 obtains, from the client device 101, a response that includes proposed credentials (e.g., dummy credentials) associated with the client device 101, as represented by portion 305 of the call flow 300. Notably, the nature (e.g., contents) of the proposed credentials is inconsequential to whether or not the encrypting system 320 generates an encrypted session for the client device 101. What is of consequence is that the client device 101 provides, in response to the request for credentials, a response that is properly formatted.

As represented by portion 306 of the call flow 300, in response to determining that the format of the response matches a response template, the encrypting system 320 generates an encrypted wireless session (e.g., WPA2/WPA3) for the client device 101 independent of the proposed credentials associated with the client device 101. In other words, the encrypting system 320 generates the encrypted wireless session irrespective of whether the proposed credentials are valid credentials.

As represented by portion 307 of the call flow 300, in some embodiments, after the encrypted wireless session has been generated for the client device 101, the client device 101 transmits and receives encrypted traffic according to the encrypted wireless session. As a result, the client device 101 enjoys the benefits of secured traffic without having to provide valid credentials that could otherwise be used to compromise security and/or privacy of the client device 101. Additionally, the encrypting system 320 saves storage and processing resources in not having to inspect whether the proposed credentials obtained from the client device 101 are valid credentials.

In some embodiments, the call flow 300 proceeds in accordance with an extensible authentication protocol (EAP) that encapsulates TLS, such as EAP-TTLS. Accordingly, as represented by portions 303 and 304 of the call flow 300, the client device 101 may validate the encrypting system 320 based on an authentication indicator from the encrypting system 320 that corresponds to a TLS certificate. Moreover, the encrypting system 320 obtains a network group identifier from an identity verification broker via a TLS tunnel in order to on-board the encrypting system 320. Consequently, the client device 101 is enabled to verify the validity of the encrypting system 320 via a TLS certificate, whereas the mechanism for authenticating the client device 101 is run inside of a TLS tunnel that does not involve the client device 101 itself.

Figure 4:
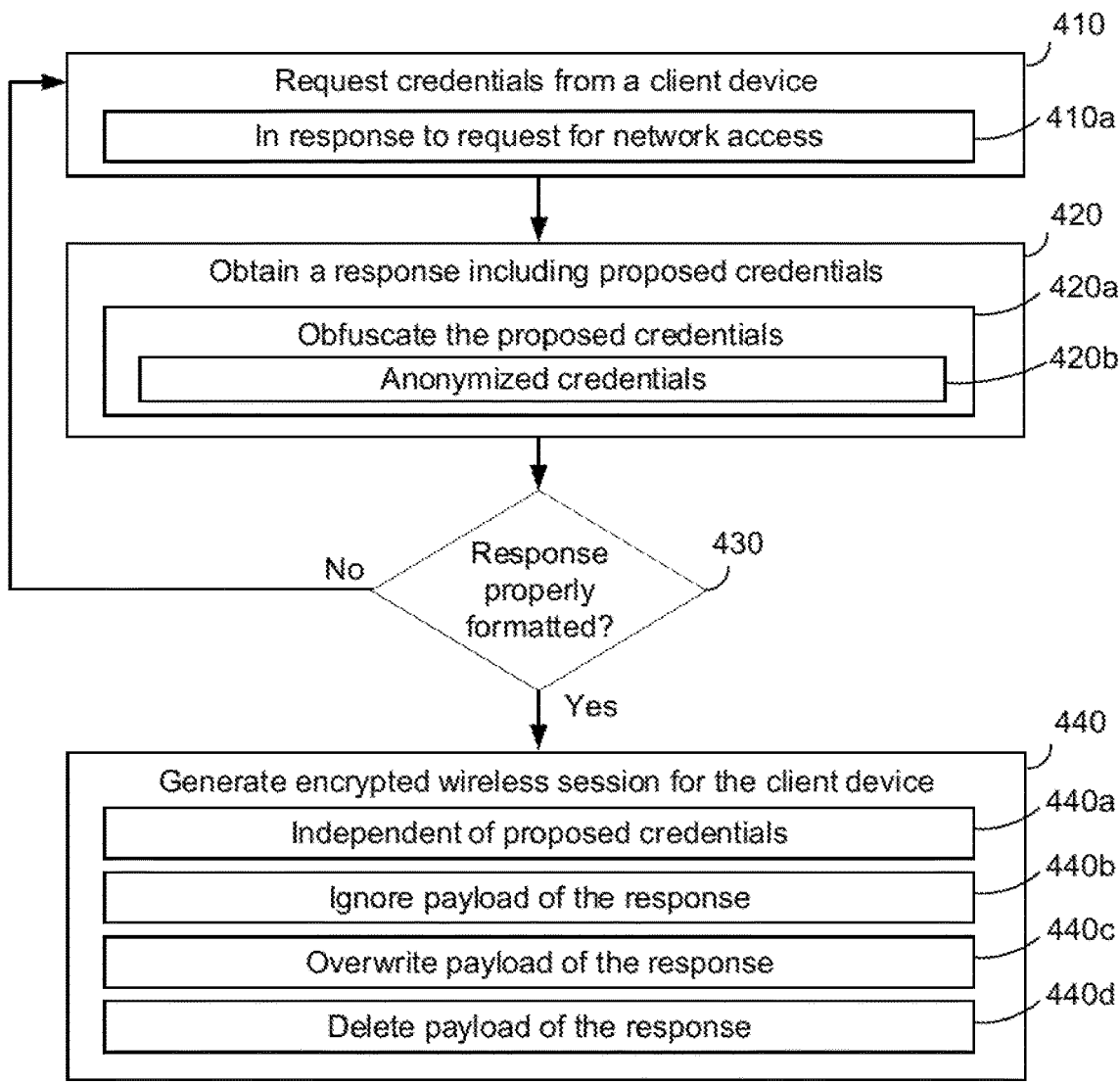
FIG. 4 is a flowchart representation of a method of anonymously generating an encrypted session for a client device in accordance with some embodiments.

FIG. 4 is a flowchart representation of a method 400 of anonymously generating an encrypted session for a client device in accordance with some embodiments. In various embodiments, the method 400 is performed by an encrypting system, such as the encrypting system 230 in FIG. 2. In various embodiments, the method 400 is performed by one of the encrypting systems 112c, 114c, 116c, or 118c in FIG. 1. In various embodiments, the method 400 is performed by a distributed encrypting system, such as a combination of two or more of the encrypting systems 112c, 114c, 116c, or 118c in FIG. 1. Briefly, the method 400 includes generating an encrypted session for a client device as long as the client device responds to a request for credentials with a correctly formatted message, regardless of proposed credentials within the message.

To that end, as represented by block 410, in some embodiments, the method 400 includes providing, to the client device, a request for credentials associated with the client device. In some embodiments, as represented by block 410a, the request for credentials is provided in response to receiving a request for network access from the client device. For example, with reference to FIG. 1, the client device 101 sends a request for network access to the access point 112, which communicates this information to the encrypting system 118c within the WLAN authentication system 118. In response, the encrypting system 118c directs the access point 112 to request credentials from the client device 101.

As represented by block 420, the method 400 includes, in response to providing, to a client device in the wireless network, a request for credentials associated with the client device, obtaining, from the client device, a response including proposed credentials associated with the client device. The validity of the proposed credentials is irrelevant. In other words, the proposed credentials can be characterized as dummy credentials. In some embodiments, the response includes a MAC address of the client device. In some embodiments, the payload of the response is empty, whereas the header of the response is property formatted. In some embodiments, the request for credentials is provided to the client device according to an authentication protocol, such as EAP. For example, with reference to FIG. 1, the client device 101 provides, to the encrypting system 112c within the access point 112, a response including proposed credentials.

As represented by block 420a, in some embodiments, the method 400 includes generating obfuscated credentials by obfuscating the proposed credentials from the client device and providing the obfuscated credentials to an authentication system (e.g., AAA/RADIUS server). For example, in some embodiments, as represented by block 420b, the obfuscated credentials correspond to anonymized credentials. In this way, the identity of the client device and potentially the user of the client device are anonymized, thereby enhancing the security and privacy of the client device and the user.

As represented by block 430, the method 400 includes determining whether or not the format of the response matches a response template. In response to determining that the format of the response matches the response template, the method 400 proceeds to block 440. In response to determining that the format of the response does not match the response template, the method 400 reverts back to block 410.

As represented by block 440, the method 400 includes generating an encrypted wireless session for the client device. As represented by block 440a, the encrypted wireless is generated independent of the proposed credentials associated with the client device. In other words, the encrypted wireless session is generated irrespective of the contents of the proposed credentials provided by the client device. In some embodiments, the encryption corresponds to over-the-air (OTA) encryption, such as WPA2, WPA3, and/or the like. For example, with reference to FIG. 1, the client device 101 sends and receives WPA3-encrypted packets to and from the access point 112. In some embodiments, the encrypted wireless session corresponds to a layer two (L2) encryption (e.g., encryption at the media access control (MAC) layer). In some embodiments, generating the encrypted wireless session for the client device includes generating a common cipher suite and common keying material between the encrypting system and the client device, such as via a transport layer security (TLS) record layer cipher suite. In some embodiments, generating the encrypted wireless session occurs as part of an EAP-TTLS mechanism, such as EAP-TTLS with inner password authentication protocol (PAP), in order to reduce the number of queries to the client device.

As represented by block 440b, in some embodiments, the method 400 includes, in response to determining that the format of the response matches the response template, ignoring the payload of the response. As represented by block 440c, in some embodiments, the method 400 includes, in response to determining that the format of the response matches the response template, overwriting the payload of the response. As represented by block 440d, in some embodiments, the method 400 includes, in response to determining that the format of the response matches the response template, deleting the payload of the response.

Figure 5:
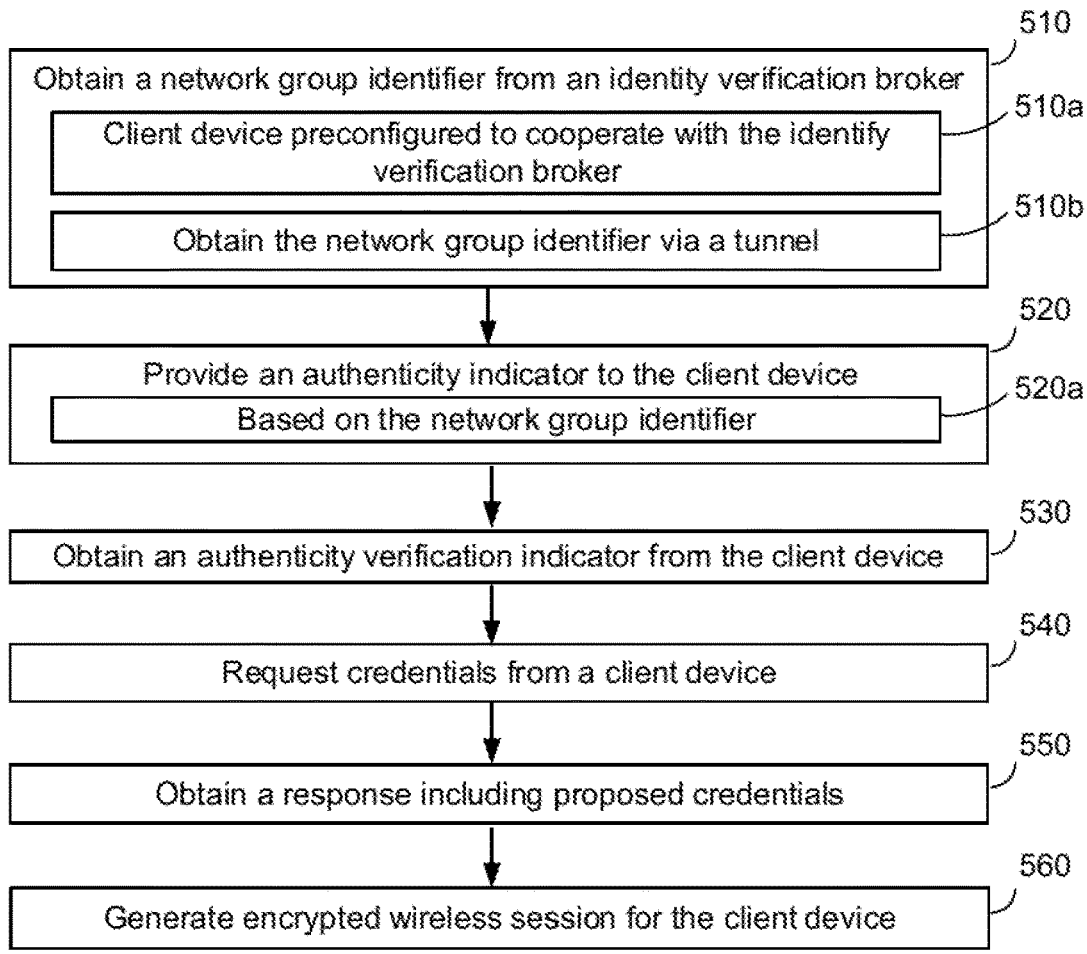
FIG. 5 is a flowchart representation of a method of utilizing a network group identifier in order to anonymously generate an encrypted session for a client device in accordance with some embodiments.

FIG. 5 is a flowchart representation of a method 500 of utilizing a network group identifier in order to anonymously generate an encrypted session for a client device in accordance with some embodiments. In various embodiments, the method 500 is performed by one of the encrypting systems 112c, 114c, 116c, or 118c in FIG. 1. In various embodiments, the method 500 is performed by a distributed encrypting system, such as a combination of two or more of the encrypting systems 112c, 114c, 116c, or 118c in FIG. 1. Briefly, the method 500 includes an encrypting system providing, to a client device, an authenticity indicator (optionally) based on an obtained network identifier in order to enable the client device to verify that the validity of the encrypting system before generating an encrypted wireless session for the client device.

To that end, as represented by block 510, in some embodiments, the method 500 includes an encrypting system obtaining, from an identity verification broker, a network group identifier. For example, with reference to FIG. 2, the encrypting system 230 obtains a network group identifier from the identity verification broker 250. In various embodiments, the encrypting system obtains the network group identifier in response to providing a request, to the identity verification broker, to join a group (e.g., federation) of trusted network entities. In response to determining that the encrypting system is a valid network entity (e.g., not a rogue entity), the identity verification broker provides the network group identifier to the encrypting system. In this way, the identity verification broker on-boards the encrypting system. In various embodiments, the identity verification broker is configured to implement terms and conditions, acceptable use policies, liability disclaimers, and provisions for providing a certain number of permanent identities of client devices in a WLAN. In some embodiments, the identity verification broker is integrated within a cloud-based system, such as a software as a service (SaaS) system.

As represented by block 510a, in some embodiments, a client device is preconfigured to cooperate with the identify verification broker. In various embodiments, the client device is configured out-of-the-box to cooperate with a list of trusted network entities each identified by a corresponding network group identifier provided by the identity verification broker. For example, in some embodiments, the client device is preconfigured to cooperate with any encrypting system that obtained a network group identifier indicative of a group of wireless networks each associated with a particular coffee-shop chain. For example, with reference to FIG. 2, the client device 101 is preconfigured to cooperate with any network group identifiers associated with the particular coffee-shop chain. Thus, upon entering coverage area provided by an access point 112 of a WLAN 110 operated by the particular coffee-shop chain, the client device 101 verifies an authenticity indicator (see block 530, below) from the access point 112 because the access point 112 had obtained a network group identifier that is acceptable to the client device 101. In some embodiments, the client device is preconfigured to cooperate with the identity verification broker without user intervention.

As represented by block 510b, in some embodiments, the method 500 includes obtaining the network group identifier from the identity verification broker via a tunnel. For example, with reference to FIG. 2, the encrypting system 230 obtained via an EAP-TTLS tunnel.

As represented by block 520, in some embodiments, the method 500 includes providing, to the client device, an authenticity indicator associated with the encrypting system. The authenticity indicator indicates to the client device that the encrypting system is a valid system (e.g., not a rogue entity). For example, with reference to FIG. 1, the encrypting system 118c provides an authenticity indicator to the client device 101 in order to communicate to the client device that the encrypting system 118c is a trustworthy entity. In some embodiments, the encrypting system corresponds to a RADIUS server that provides a server certificate and/or a public/private key certificate to the client device. In some embodiments, the client device is configured with a certificate of the trusted certificate authority (CA) in order to verify the authenticity indicator. In some embodiments, the authenticity indicator is provided to the client device in response to receiving, from the client device, an EAP-Start message.

As represented by block 520a, in some embodiments, the authenticity indicator is based on the network group identifier. For example, with reference to FIG. 2, the encrypting system 230 obtains a network group identifier from the identity verification broker 250, and based on the network group identifier provides the authenticity indicator to the client device 101. If the client device 101 is preconfigured to verify (e.g., trust) the network group identifier, then the client device 101 responds with an authentication verification indicator, as represented by block 530.

As represented by block 530, in some embodiments, the method 500 includes obtaining, from the client device, an authentication verification indicator. The authentication verification indicator indicates to the encrypting system that the client device regards the encrypting system as a valid, trustworthy (e.g., not rogue) network entity.

Figure 6:
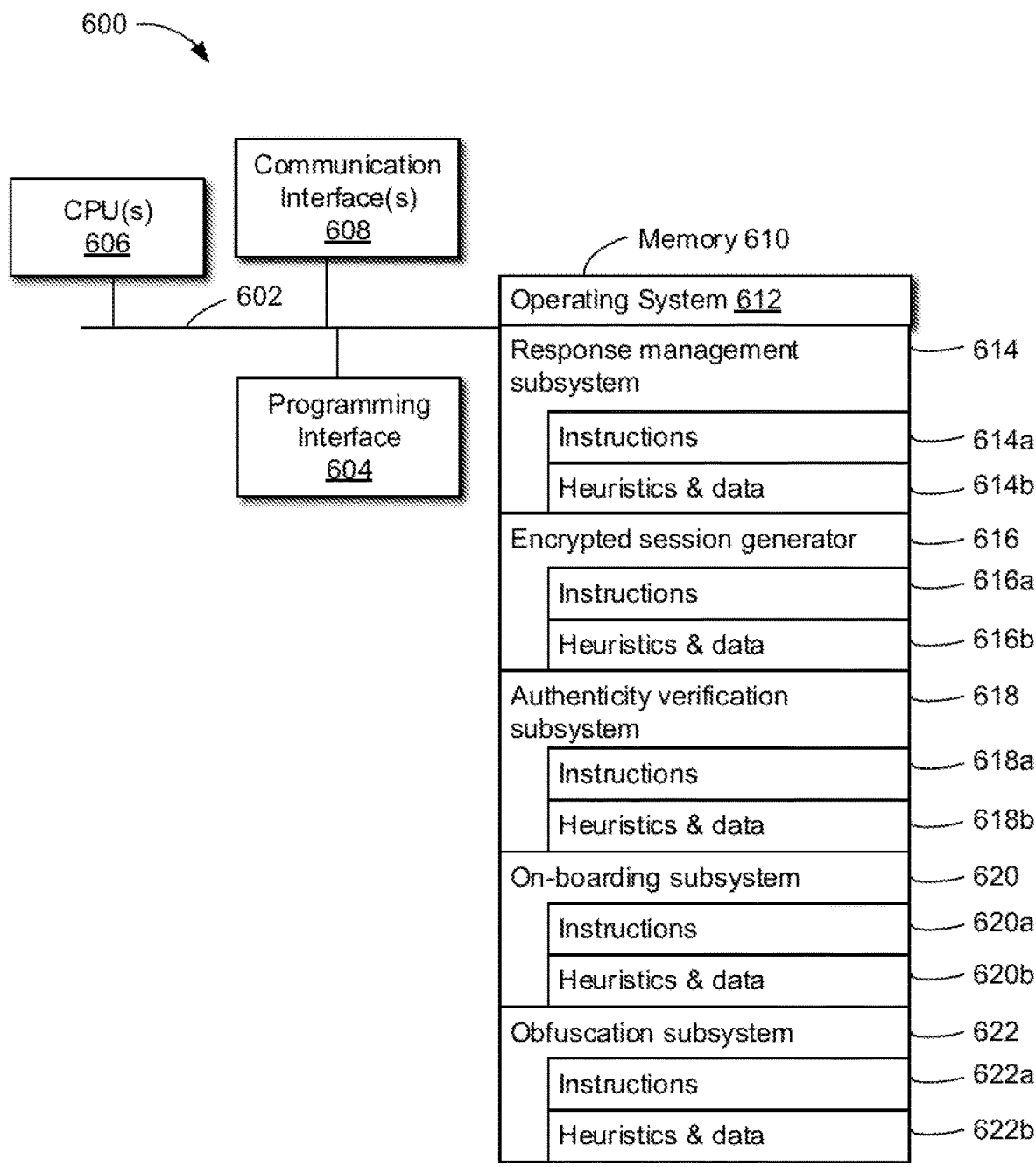
FIG. 6 is a block diagram of an encrypting system in accordance with some embodiments.

As represented by block 540, in some embodiments, the method 500 includes, in response to obtaining the authentication verification indicator from the client device, requesting credentials from the client device. As represented by block 550, the method 500 includes obtaining, from the client device, a response including proposed credentials associated with the client device. As represented by block 560, the method 500 includes, in response to determining that the format of the response matches a response template, generating an encrypted wireless session for the client device independent of the proposed credentials associated with the client device FIG. 6 is a block diagram of an encrypting system 600 in accordance with some embodiments. In various embodiments, the encrypting system 600 is similar to and adapted from one of the encrypting systems 112c, 114c, 116c, or 118c in FIG. 1. In various embodiments, the encrypting system 600 corresponds to a distributed encrypting system, and thus is similar to and adapted from a combination of two or more of the encrypting systems 112c, 114c, 116c, or 118c in FIG. 1. In various embodiments, the encrypting system 600 is similar to and adapted from the encrypting system 300 in FIG. 3. While certain specific features are illustrated, those skilled in the art will appreciate from the present disclosure that various other features have not been illustrated for the sake of brevity, and so as not to obscure more pertinent aspects of the embodiments disclosed herein.

To that end, as a non-limiting example, in some embodiments, the encrypting system 600 includes one or more processing units (CPUs) 606, one or more communication interfaces 608, a memory 610, a programming (I/O) interface 604, and one or more communication buses 602 for interconnecting these and various other components.

In some embodiments, the one or more communication buses 602 include circuitry that interconnects and controls communications between system components. The memory 610 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. the memory 610 optionally includes one or more storage devices remotely located from the one or more CPUs 606. the memory 610 includes a non-transitory computer readable storage medium. in some embodiments, the memory 610 or the non-transitory computer readable storage medium of the memory 610 stores the following programs, modules and data structures, or a subset thereof including an optional operating system 612, a response management subsystem 614, an encrypted session generator 616, an authenticity verification subsystem 618, an on-boarding subsystem 620, and an obfuscation subsystem 622.

The operating system 612 includes procedures for handling various basic system services and for performing hardware dependent tasks.

In some embodiments, the response management subsystem 614 is configured to obtain, from a client device in a wireless network, a response including proposed credentials associated with the client device in response to providing a request for credentials associated with the client device to the client device. In some embodiments, the response management subsystem 614 is configured to provide, to the client device, the request for the credentials associated with the client device in response to obtaining a request, from the client device, for access to the wireless network. In some embodiments, the response management subsystem 614 is configured to determine whether or not the format of the response matches a response template. In some embodiments, the response management subsystem 614 is configured to, in response to determining that the format of the response matches the response template, ignore the payload of the response. In some embodiments, the response management subsystem 614 is configured to, in response to determining that the format of the response matches the response template, overwrite the payload of the response. In some embodiments, the response management subsystem 614 is configured to, in response to determining that the format of the response matches the response template, overwrite the payload of the response. To that end, in various embodiments, the response management subsystem 614 includes instructions and/or logic 614a and heuristics and metadata 614b.

In some embodiments, the encrypted session generator 616 is configured to, in response to determining that the format of the response matches the response template, generate an encrypted wireless session for the client device independent of the proposed credentials associated with the client device. To that end, in various embodiments, the encrypted session generator 616 includes instructions and/or logic 616a and heuristics and metadata 616b.

In some embodiments, the authenticity verification subsystem 618 is configured to provide, to the client device, an authenticity indicator associated with the encrypting system; obtain, from the client device, an authenticity verification indicator indicating verification of the authenticity indicator; and in response to obtaining the authenticity verification indicator, provide, to the client device, the request for credentials associated with the client device. To that end, in various embodiments, the authenticity verification subsystem 618 includes instructions and/or logic 618a and heuristics and metadata 618b.

In some embodiments, the on-boarding subsystem 620 is configured to obtain, from an identity verification broker, a network group identifier, wherein the authenticity indicator is based on the network group identifier. To that end, in various embodiments, the on-boarding subsystem 620 includes instructions and/or logic 620a and heuristics and metadata 620b.

In some embodiments, the obfuscation subsystem 622 is configured to generate obfuscated credentials (e.g., anonymized credentials) by obfuscating the proposed credentials from the client device and provide the obfuscated credentials to an authentication system. To that end, in various embodiments, the obfuscation subsystem 622 includes instructions and/or logic 622a and heuristics and metadata 622b.

Moreover, FIG. 6 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first network could be termed a second network, and, similarly, a second network could be termed a first network, which changing the meaning of the description, so long as all occurrences of the "first network" are renamed consistently and all occurrences of the "second network" are renamed consistently. The first network and the second network are both networks, but they are not the same networks.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    providing, from an encryption system in a wireless network to a client device in the wireless network, a request for credentials associated with the client device;
    obtaining, at the encryption system from the client device, a response including proposed credentials associated with the client device;
    and
    in response to determining that a format of the response matches a response template, generating an encrypted wireless session for the client device independently of the proposed credentials associated with the client device by ignoring, overwriting, or deleting a payload of the response that includes the proposed credentials before generating the encrypted wireless session.

2. The method of claim 1, further comprising, before providing the request for the credentials associated with the client device:
    obtaining, at the encryption system from the client device, an access request for access to the wireless network; and
    providing, to the client device, the request for the credentials associated with the client device.

3. The method of claim 1, further comprising:
    providing, to the client device, an authenticity indicator associated with the encrypting system;
    obtaining, from the client device, an authenticity verification indicator indicating verification of the authenticity indicator; and
    in response to obtaining the authenticity verification indicator, providing, to the client device, the request for credentials associated with the client device.

4. The method of claim 3, further comprising, obtaining, from an identity verification broker, a network group identifier, wherein the authenticity indicator is based on the network group identifier.

5. The method of claim 4, wherein the client device is preconfigured to cooperate with the identity verification broker.

6. The method of claim 1, further comprising, generating obfuscated credentials by obfuscating the proposed credentials from the client device, and providing the obfuscated credentials to an authentication system.

7. The method of claim 6, wherein the obfuscated credentials correspond to anonymized credentials.

8. An encrypting system comprising:
    a processor; and
    a non-transitory memory, including instructions that when executed by the processor enable performance of an operation including:
        providing, to a client device, a request for credentials associated with the client device; and
        obtaining, from the client device, a response including proposed credentials associated with the client device,
        in response to determining that a format of the response matches a response template, generating an encrypted wireless session for the client device independently of the proposed credentials associated with the client device;
        generating obfuscated credentials that correspond to anonymized credentials by obfuscating the proposed credentials from the client device; and
        providing the obfuscated credentials to an authentication system.

9. The encrypting system of claim 8, wherein the operation further includes:
    providing, to the client device, the request for the credentials associated with the client device, in response to obtaining an access request, from the client device, for access to a wireless network associated with the encryption system.

10. The encrypting system of claim 8, wherein the operation further includes:
    providing, to the client device, an authenticity indicator associated with the encrypting system;
    obtaining, from the client device, an authenticity verification indicator indicating verification of the authenticity indicator; and
    in response to obtaining the authenticity verification indicator, providing, to the client device, the request for credentials associated with the client device.

11. The encrypting system of claim 10, wherein the operation further includes:
    obtaining, from an identity verification broker, a network group identifier, wherein the authenticity indicator is based on the network group identifier.

12. The encrypting system of claim 11, wherein the client device is preconfigured to cooperate with the identity verification broker.

13. The encrypting system of claim 11, wherein the network group identifier is obtained from the identity verification broker via a tunnel.

14. The encrypting system of claim 8, wherein the operation further includes:
    in response to determining that the format of the response matches the response template, ignoring a payload of the response that includes the proposed credentials.

15. A non-transitory computer readable medium storing instructions, which, when executed by one or more processors of an encrypting system, cause the encrypting system to:
    provide, to a client device, an authenticity indicator associated with the encrypting system;
    obtain, from the client device, an authenticity verification indicator indicating verification of the authenticity indicator;
    in response to obtaining the authenticity verification indicator, provide, to the client device, a credential request for credentials associated with the client device;

obtain, from the client device, a credential response including proposed credentials associated with the client device;
and
in response to determining that a format of the response matches a response template, generate an encrypted wireless session for the client device independently of the proposed credentials associated with the client device.

* * * * *